(12) United States Patent
Chen et al.

(10) Patent No.: US 11,879,265 B2
(45) Date of Patent: Jan. 23, 2024

(54) THREE-DIMENSIONAL ENERGY DISSIPATION AND VIBRATION ISOLATION BEARING

(71) Applicant: HAINAN UNIVERSITY, Haikou (CN)

(72) Inventors: Yun Chen, Haikou (CN); Jiajia Mu, Haikou (CN)

(73) Assignee: HAINAN UNIVERSITY, Haikou (CN)

(*) Notice: Subject to any disclaimer, the term of this patent is extended or adjusted under 35 U.S.C. 154(b) by 0 days.

(21) Appl. No.: 18/321,885

(22) Filed: May 23, 2023

(65) Prior Publication Data
US 2023/0295946 A1 Sep. 21, 2023

(30) Foreign Application Priority Data
May 26, 2022 (CN) .......................... 202210589606.8

(51) Int. Cl.
*E04H 9/02* (2006.01)
(52) U.S. Cl.
CPC .................................. *E04H 9/022* (2013.01)
(58) Field of Classification Search
CPC . E04H 9/021; E04H 9/022; E04B 1/36; E04B 1/98
See application file for complete search history.

(56) References Cited

U.S. PATENT DOCUMENTS

| | | | | |
|---|---|---|---|---|
| 5,881,507 A * | 3/1999 | Yoo | .......................... | E04H 9/022 248/565 |
| 2006/0137264 A1* | 6/2006 | Shizuku | .................. | E04H 9/022 52/167.7 |
| 2014/0318043 A1* | 10/2014 | Hao | ........................ | E04H 9/022 52/167.4 |
| 2017/0268225 A1* | 9/2017 | Wake | ...................... | E04H 9/022 |
| 2019/0120321 A1* | 4/2019 | Kochiyama | ............... | F16F 1/40 |

FOREIGN PATENT DOCUMENTS

| | | |
|---|---|---|
| CN | 201330515 Y | 10/2009 |
| CN | 110593416 A | 12/2019 |

OTHER PUBLICATIONS

CNIPA, Notification of First Office Action for Chinese application CN202210589606.8, dated Dec. 5, 2022.
CNIPA, Notification to grant patent right for Chinese application CN202210589606.8, dated Feburary 9, 2023.

* cited by examiner

*Primary Examiner* — Christine T Cajilig
(74) *Attorney, Agent, or Firm* — Zhigang Ma

(57) ABSTRACT

The present invention discloses a three-dimensional energy dissipation and vibration isolation bearing. A laminated rubber bearing comprises an upper connecting plate and a lower connecting plate, and the upper connecting plate and the lower connecting plate are tightened through a stay cable; U-shaped strips are arranged around the laminated rubber bearing and fixed with the edge of the steel plate and the edge of the lower connecting plate; a support shaft is fixed on the top surface of the upper connecting plate; disk springs are sleeved on the support shaft and clamped between the upper connecting plate and the steel plate and between the steel plate and the jacking nut; and anchor bars are vertically fixed on the top surface of the U-shaped frame and the bottom surface of the lower connecting plate.

5 Claims, 2 Drawing Sheets

THREE-DIMENSIONAL ENERGY DISSIPATION AND VIBRATION ISOLATION BEARING

TECHNICAL FIELD

The present invention relates to the technical field of vibration isolation of civil engineering structure, and particularly relates to a novel three-dimensional energy dissipation and vibration isolation bearing.

BACKGROUND

At present, the modern vibration isolation technology is widely used in civil engineering, and the vibration isolation structure is recognized by the earthquake engineering community for excellent vibration absorption effect, safety, durability, economy and practicality. However, the effect of vertical earthquake waves on building structures is not considered in the design of vibration isolation of most building structures. According to the characteristics of the action of earthquake waves on buildings, the effects on the building structures mainly include one horizontal earthquake component, one vertical earthquake component and three rotating earthquake components. A large number of earthquake damages show that the effect of the vertical earthquake component on structures cannot be ignored.

With the increasing development of science and technology, energy dissipation and vibration absorption technologies are increasingly mature to further improve the people's safety guarantee performance. More and more concepts of energy dissipation and vibration absorption also appear in people's vision. However, the research on vertical vibration isolation bearings is still mainly focused on traditional disk springs, the space and scope of the research are small, and the application in practical engineering is even less.

Therefore, how to provide a multi-directional energy dissipation and vibration absorption member with high energy dissipation and significant vibration isolation effect is a problem to be urgently solved by those skilled in the art.

SUMMARY

In view of this, the present invention provides a three-dimensional energy dissipation and vibration isolation bearing and aims to solve the above technical problem.

To achieve the above purpose, the present invention adopts the following technical solution:

A three-dimensional energy dissipation and vibration isolation bearing, comprising:

A laminated rubber bearing; the laminated rubber bearing comprises an upper connecting plate and a lower connecting plate arranged in parallel, the upper connecting plate and the lower connecting plate are tightened through a stay cable, and a plurality of internal steel plates and a plurality of pieces of laminated rubber which are in staggered and superposed arrangement are clamped between the upper connecting plate and the lower connecting plate;

A U-shaped frame; the U-shaped frame is inverted and fixed on the edge of the upper connecting plate, and a steel plate is fixed between two side plates of the U-shaped frame;

U-shaped strips; a plurality of U-shaped strips are used and arranged around the laminated rubber bearing, and both ends of each U-shaped strip are respectively fixed with the edge of the steel plate and the edge of the lower connecting plate;

A support shaft; the support shaft is vertically fixed on the top surface of the upper connecting plate, and the top end penetrates through the steel plate and is fastened with a jacking nut; and two disk springs are sleeved on the support shaft, and respectively clamped between the upper connecting plate and the steel plate and between the steel plate and the jacking nut;

Anchor bars; a plurality of anchor bars are used and divided into two groups, and the two groups of anchor bars are respectively vertically fixed on the top surface of the U-shaped frame and the bottom surface of the lower connecting plate.

By adopting the above technical solution, the present invention provides a novel three-dimensional energy dissipation and vibration isolation bearing, which has a multi-directional energy dissipation and vibration absorption structure with high energy dissipation and significant vibration isolation effect and can effectively decompose one horizontal earthquake component, one vertical earthquake component and three rotating earthquake components during an earthquake, with a strong using effect.

The novel three-dimensional energy dissipation and vibration isolation bearing provided by the present invention has the advantages of good vibration isolation and energy dissipation effect, convenient construction and easy material acquisition, and has good durability, simple and convenient manufacturing, and low cost due to the use of steel as the main material; the present invention can isolate the action of the earthquake force in any horizontal direction, and also has good vibration isolation performance and self-resetting ability under the vertical earthquake action, which can effectively solve the problem that vertical earthquake waves are rarely considered in engineering vibration isolation design at the present stage; the present invention has strong practicability and can be widely used in buildings and bridge structures.

Moreover, an appropriate structural form and bearing can be selected to determine the thickness of the steel plate according to the local fortification intensity and the type of the building structure. Under the vertical earthquake action, the U-shaped strips and the laminated rubber bearing act together, and the steel plate slips relatively to the lower connecting plate of the laminated rubber bearing to drive the U-shaped strips and the disk springs to deform together for energy dissipation, which greatly increases the bearing capacity and energy dissipating capacity of the structure, and enables the bearing to have self-resetting ability due to the action of initial stiffness when the earthquake intensity decreases. Under the horizontal earthquake action, regardless of the direction of the horizontal earthquake force, the U-shaped strips arranged circumferentially can work together according to the respective deformation modes, and the overall energy dissipating capacity is good; and the laminated rubber bearing is rigidly connected to the steel plate through the support shaft, and can generate horizontal displacement with the steel plate, which will not affect horizontal deformation for energy dissipation.

Preferably, in the above three-dimensional energy dissipation and vibration isolation bearing, an upper seal plate and a lower seal plate are respectively fixed on the corresponding surfaces of the upper connecting plate and the lower connecting plate through bolts, and the internal steel plates and the laminated rubber are clamped between the upper seal plate and the lower seal plate; and the central part of the laminated rubber is provided with a lead core.

Preferably, in the above three-dimensional energy dissipation and vibration isolation bearing, the side wall of a stereostructure composed of the internal steel plates and the laminated rubber is wrapped with protective rubber.

Preferably, in the above three-dimensional energy dissipation and vibration isolation bearing, both ends of the stay cable are respectively fastened to the top surface of the upper connecting plate and the bottom surface of the lower connecting plate through lock nuts. The tensile failure of the laminated rubber bearing can be avoided by tightening the stay cable.

Preferably, in the above three-dimensional energy dissipation and vibration isolation bearing, a backing plate is fixed between the edge of the upper connecting plate and the U-shaped frame, and the backing plate is abutted against but not connected with the U-shaped frame. In this way, when the whole bearing is subjected to a horizontal force, the horizontal force can be better transmitted to the laminated rubber bearing through the U-shaped frame to drive the laminated rubber bearing to generate horizontal displacement.

Preferably, in the above three-dimensional energy dissipation and vibration isolation bearing, a plurality of stiffening ribs are uniformly fixed on the outer side wall of the U-shaped frame, and the stiffening ribs are located between the bottom edge of the U-shaped frame and the steel plate. The stiffening ribs can further improve the structure stability.

Preferably, in the above three-dimensional energy dissipation and vibration isolation bearing, both ends of each U-shaped strip are respectively fixed with the edge of the steel plate and the edge of the lower connecting plate by means of welding or bolted connection, and each U-shaped strip remains in an elastic state under the horizontal displacement of minor earthquakes, and bends and yields for energy dissipation under the horizontal displacement of medium or major earthquakes; and the U-shaped strips perform the function of vertical energy dissipation and vibration absorption under the vertical design displacement, which can improve the structure stability of connection, and facilitate removal and replacement under different use conditions in the case of bolted connection.

Preferably, in the above three-dimensional energy dissipation and vibration isolation bearing, the steel plate is located in the middle lower part of the U-shaped frame; and the U-shaped frame has sufficient rigidity, and remains in an elastic state under the vertical load of the anchor bars.

Preferably, in the above three-dimensional energy dissipation and vibration isolation bearing, the steel plate, the upper connecting plate, the upper seal plate, the lower seal plate and the lower connecting plate are rectangular or circular disk bodies; the steel plate is a rectangular disk body; and the jacking nut shall apply pre-pressure to the upper and lower disk springs to ensure that the disk spring located on the steel plate is in a compressed state after the bearing is installed.

Preferably, in the above three-dimensional energy dissipation and vibration isolation bearing, the U-shaped frame is divided into an upper part and a lower part by the steel plate, and the edge of the steel plate is flush with the outer side wall of the U-shaped frame.

Preferably, in the above three-dimensional energy dissipation and vibration isolation bearing, the anchor bars facilitate the connection and fixing of the novel three-dimensional energy dissipation and vibration isolation bearing provided by the present invention.

Preferably, in the above three-dimensional energy dissipation and vibration isolation bearing, the support shaft penetrates through the steel plate, and the steel plate can generate relative displacement in the vertical direction, so the effect of energy dissipation and vibration absorption is more significant.

Preferably, in the above three-dimensional energy dissipation and vibration isolation bearing, the U-shaped strips are uniformly arranged on each edge of the steel plate and each edge of the lower connecting plate so that the structure stability is stronger.

Preferably, in the above three-dimensional energy dissipation and vibration isolation bearing, the internal steel plates and the laminated rubber are bonded and fixed.

Preferably, in the above three-dimensional energy dissipation and vibration isolation bearing, a plurality of support shafts are used, and uniformly fixed on the top surface of the upper connecting plate to ensure that the upper connecting plate is uniformly compressed.

It can be known from the above technical solution that compared with the prior art, the present invention discloses and provides a three-dimensional energy dissipation and vibration isolation bearing, and has the following beneficial effects:

1. The novel three-dimensional energy dissipation and vibration isolation bearing provided by the present invention has the function of high-efficiency three-dimensional vibration isolation to realize the earthquake response of the vibration absorption structure in three directions, and also has the function of high-efficiency energy dissipation in three directions to realize integration of vibration isolation and energy dissipation in three directions.

2. The present invention has the advantages of good vibration isolation and energy dissipation effect, convenient construction and easy material acquisition, and has good durability, simple and convenient manufacturing, and low cost due to the use of steel as the main material; the present invention can isolate the action of the earthquake force in any horizontal direction, and also has good vibration isolation performance and self-resetting ability under the vertical earthquake action, which can effectively solve the problem that vertical earthquake waves are rarely considered in engineering vibration isolation design at the present stage; the present invention has strong practicability and can be widely used in buildings and bridge structures.

Under the vertical earthquake action, the U-shaped strips and the laminated rubber bearing of the present invention act together, and the steel plate slips vertically relatively to the lower connecting plate of the laminated rubber bearing to drive the U-shaped strips and the disk springs to deform together for energy dissipation, which greatly increases the vibration isolation and energy dissipating capacity of the structure, and enables the bearing to have self-resetting ability under the action of structure weight; and under the horizontal earthquake action, regardless of the direction of the horizontal earthquake force, the U-shaped strips arranged circumferentially can work together according to the respective deformation modes, and the overall energy dissipating capacity is good.

In the present invention, the laminated rubber bearing is made of the internal steel plates and the laminated rubber which are staggered, superposed and bonded through a special process to form the vibration isolation bearing. The internal steel plates and the laminated rubber in the laminated rubber bearing are bonded to each other, the internal steel plates play a role of constraining the laminated rubber, and under the action of a vertical load, the internal steel plates constrain the laminated rubber to jointly bear the vertical load so that the laminated rubber bearing has sufficient vertical bearing capacity and rigidity. When the vibration isolation bearing is subjected to horizontal earthquake action, the laminated rubber can provide considerable lateral displacement without loss of stability, so the earthquake energy can be effectively consumed.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

In the figures:
1—anchor bar; 2—U-shaped strip; 3—laminated rubber bearing; 31—stay cable; 32—upper connecting plate; 33—upper seal plate; 34—bolt; 35—protective rubber; 36—internal steel plate; 37—laminated rubber; 38—lower seal plate; 39—lower connecting plate; 4—stiffening rib; 5—disk spring; 6—support shaft; 7—U-shaped frame; 8—backing plate; and 9—steel plate.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
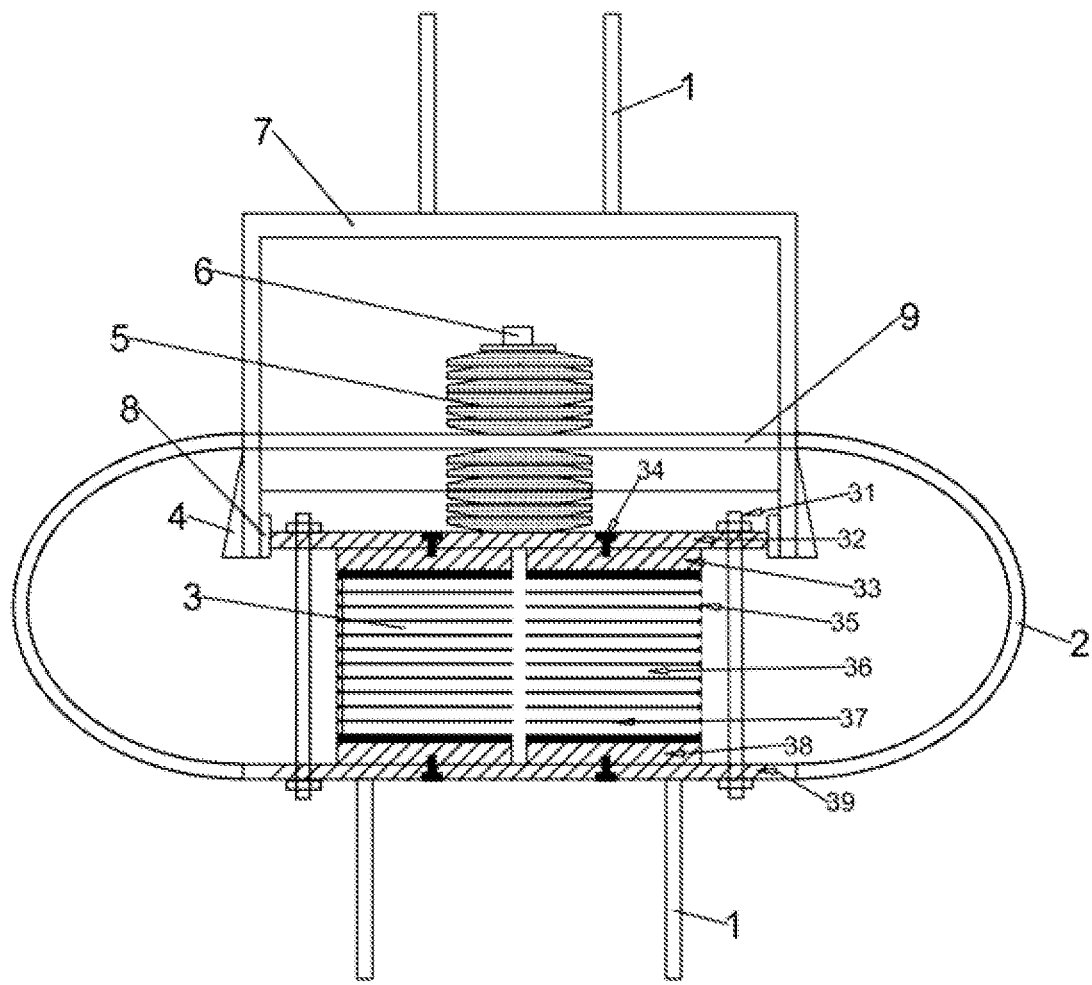
FIG. 1 is a front sectional structural schematic diagram of a three-dimensional energy dissipation and vibration isolation bearing provided by the present invention.
Figure 2:
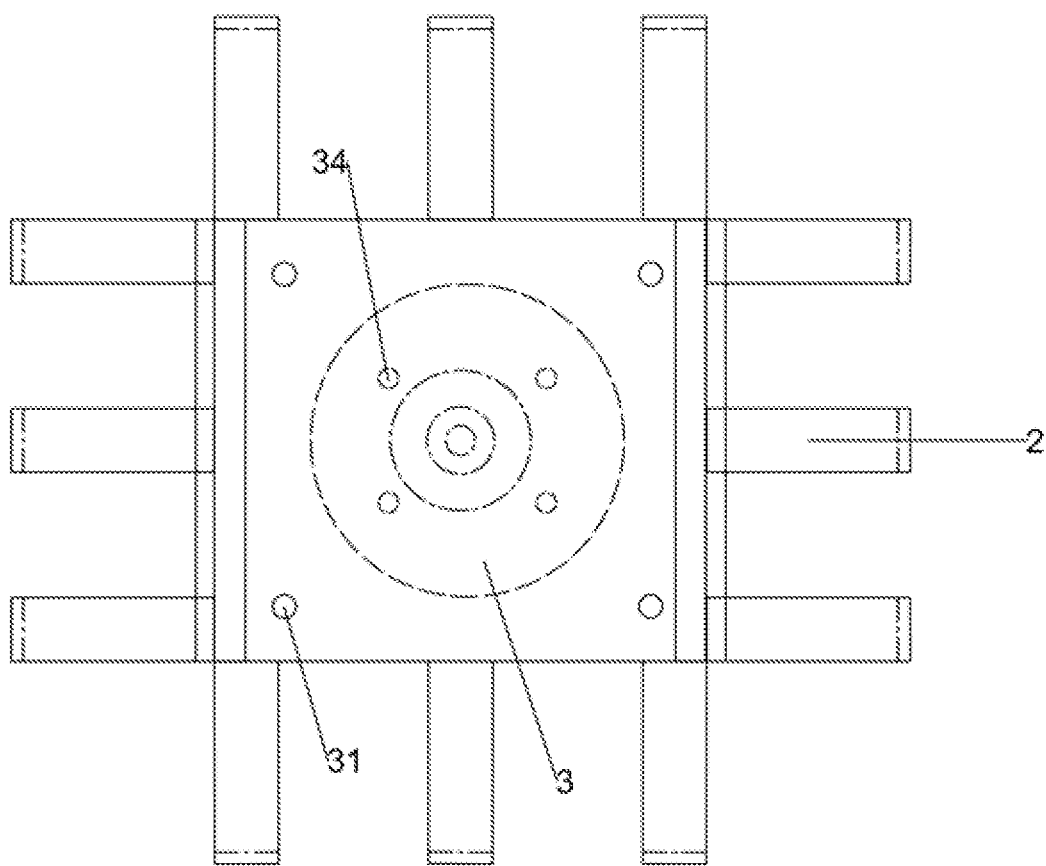
FIG. 2 is a top sectional structural schematic diagram of a three-dimensional energy dissipation and vibration isolation bearing provided by the present invention.

As shown in FIG. 1 and FIG. 2, embodiments of the present invention disclose a three-dimensional energy dissipation and vibration isolation bearing, comprising:

A laminated rubber bearing 3; the laminated rubber bearing 3 comprises an upper connecting plate 32 and a lower connecting plate 39 arranged in parallel, the upper connecting plate 32 and the lower connecting plate 39 are tightened through a stay cable 31, and a plurality of internal steel plates 36 and a plurality of pieces of laminated rubber 37 which are in staggered and superposed arrangement are clamped between the upper connecting plate 32 and the lower connecting plate 39;

A U-shaped frame 7; the U-shaped frame 7 is inverted and fixed on the edge of the upper connecting plate 32, and a steel plate 9 is fixed between two side plates of the U-shaped frame 7;

U-shaped strips 2; a plurality of U-shaped strips 2 are used and arranged around the laminated rubber bearing 3, and both ends of each U-shaped strip 2 are respectively fixed with the edge of the steel plate 9 and the edge of the lower connecting plate 39;

A support shaft 6; the support shaft 6 is vertically fixed on the top surface of the upper connecting plate 32, and the top end penetrates through the steel plate 9 and is fastened with a jacking nut; and two disk springs 5 are sleeved on the support shaft 6, and respectively clamped between the upper connecting plate 32 and the steel plate 9 and between the steel plate 9 and the jacking nut;

Anchor bars 1; a plurality of anchor bars 1 are used and divided into two groups, and the two groups of anchor bars 1 are respectively vertically fixed on the top surface of the U-shaped frame 7 and the bottom surface of the lower connecting plate 39.

To further optimize the above technical solution, an upper seal plate 33 and a lower seal plate 38 are respectively fixed on the corresponding surfaces of the upper connecting plate 32 and the lower connecting plate 39 through bolts 34, and the internal steel plates 36 and the laminated rubber 37 are clamped between the upper seal plate 33 and the lower seal plate 38.

To further optimize the above technical solution, the side wall of a stereostructure composed of the internal steel plates 36 and the laminated rubber 37 is wrapped with protective rubber 35.

To further optimize the above technical solution, both ends of the stay cable 31 are respectively fastened to the top surface of the upper connecting plate 32 and the bottom surface of the lower connecting plate 39 through lock nuts.

To further optimize the above technical solution, a backing plate 8 is fixed between the edge of the upper connecting plate 32 and the U-shaped frame 7.

To further optimize the above technical solution, a plurality of stiffening ribs 4 are uniformly fixed on the outer side wall of the U-shaped frame 7, and the stiffening ribs 4 are located between the bottom edge of the U-shaped frame 7 and the steel plate 9.

To further optimize the above technical solution, both ends of each U-shaped strip 2 are respectively fixed with the edge of the steel plate 9 and the edge of the lower connecting plate 39 by means of welding or bolted connection.

To further optimize the above technical solution, the steel plate 9 is located in the middle lower part of the U-shaped frame 7.

To further optimize the above technical solution, the steel plate 9, the upper connecting plate 32, the upper seal plate 33, the lower seal plate 38 and the lower connecting plate 39 are rectangular or circular disk bodies; and the steel plate 9 is a rectangular disk body.

To further optimize the above technical solution, the U-shaped frame 7 is divided into an upper part and a lower part by the steel plate 9, and the edge of the steel plate 9 is flush with the outer side wall of the U-shaped frame 7.

To further optimize the above technical solution, a plurality of support shafts 6 are used and uniformly fixed on the top surface of the upper connecting plate 32.

The present invention has the operating principle that:

An appropriate structural form and bearing can be selected to determine the thickness of the steel plates according to the local fortification intensity and the type of the building structure.

Under the vertical earthquake action, the U-shaped strips 2 and the laminated rubber bearing 3 act together, and the steel plate 9 slips relatively to the lower connecting plate 39 of the laminated rubber bearing 3 to drive the U-shaped strips 2 and the disk springs 5 to deform together for energy dissipation, which greatly increases the bearing capacity and energy dissipating capacity of the structure, and enables the bearing to have self-resetting ability due to the action of initial stiffness when the earthquake intensity decreases.

Under the horizontal earthquake action, regardless of the direction of the horizontal earthquake force, the U-shaped strips 2 arranged circumferentially can work together according to the respective deformation modes, and the overall energy dissipating capacity is good; and the laminated rubber bearing 3 is rigidly connected to the steel plate 9 through the support shaft 6, and can generate horizontal displacement with the steel plate 9, which will not affect horizontal deformation for energy dissipation. In the present invention, the laminated rubber bearing 3 is made of the internal steel plates 36 and the laminated rubber 37 which are staggered, superposed and bonded through a special process to form the vibration isolation bearing. The internal steel plates 36 and the laminated rubber 37 in the laminated rubber bearing 3 are bonded to each other, the internal steel plates 36 play a role of constraining the laminated rubber 37, and under the action of a vertical load, the internal steel plates 36 constrain the laminated rubber 37 to jointly bear the vertical load so that the laminated rubber bearing 3 has sufficient vertical bearing capacity and rigidity. When the vibration isolation bearing is subjected to horizontal earthquake action, the laminated rubber 37 can provide considerable lateral displacement without loss of stability, so the earthquake energy can be effectively consumed.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A three-dimensional energy dissipation and vibration isolation bearing, comprising:
   a laminated rubber bearing (3); the laminated rubber bearing (3) comprises an upper connecting plate (32) and a lower connecting plate (39) arranged in parallel, the upper connecting plate (32) and the lower connecting plate (39) are tightened through a stay cable (31), and a plurality of internal steel plates (36) and a plurality of pieces of laminated rubber (37) which are in staggered and superposed arrangement are clamped between the upper connecting plate (32) and the lower connecting plate (39); an upper seal plate (33) and a lower seal plate (38) are respectively fixed on corresponding surfaces of the upper connecting plate (32) and the lower connecting plate (39) through bolts (34), and the internal steel plates (36) and the laminated rubber (37) are clamped between the upper seal plate (33) and the lower seal plate (38); and a side wall of a stereostructure composed of the internal steel plates (36) and the laminated rubber (37) is wrapped with protective rubber (35);
   a U-shaped frame (7); the U-shaped frame (7) is inverted and fixed on the edge of the upper connecting plate (32), and a steel plate (9) is fixed between two side plates of the U-shaped frame (7); and a backing plate (8) is fixed between the edge of the upper connecting plate (32) and the U-shaped frame (7);
   a plurality of U-shaped strips (2); the plurality of U-shaped strips (2) are used and arranged around the laminated rubber bearing (3), and both ends of each U-shaped strip (2) are respectively fixed with the edge of the steel plate (9) and the edge of the lower connecting plate (39);
   a support shaft (6); the support shaft (6) is vertically fixed on the top surface of the upper connecting plate (32), and a top end penetrates through the steel plate (9) and is fastened with a jacking nut; and two disk springs (5) are sleeved on the support shaft (6), and respectively clamped between the upper connecting plate (32) and the steel plate (9) and between the steel plate (9) and the jacking nut;
   a plurality of anchor bars (1); the plurality of anchor bars (1) are used and divided into two groups, and the two groups of anchor bars (1) are respectively vertically fixed on the top surface of the U-shaped frame (7) and the bottom surface of the lower connecting plate (39).

2. The three-dimensional energy dissipation and vibration isolation bearing according to claim 1, wherein both ends of the stay cable (31) are respectively fastened to the top surface of the upper connecting plate (32) and the bottom surface of the lower connecting plate (39) through lock nuts.

3. The three-dimensional energy dissipation and vibration isolation bearing according to claim 1, wherein a plurality of stiffening ribs (4) are uniformly fixed on an outer side wall of the U-shaped frame (7), and the stiffening ribs (4) are located between the bottom edge of the U-shaped frame (7) and the steel plate (9).

4. The three-dimensional energy dissipation and vibration isolation bearing according to claim 1, wherein the steel plate (9) is located in a middle lower part of the U-shaped frame (7); and the U-shaped frame (7) is divided into an upper part and a lower part by the steel plate (9), and the edge of the steel plate (9) is flush with the inner side wall of the U-shaped frame (7).

5. The three-dimensional energy dissipation and vibration isolation bearing according to claim 1, wherein the upper connecting plate (32), the upper seal plate (33), the lower seal plate (38) and the lower connecting plate (39) are rectangular or circular disk bodies; and the steel plate (9) is a rectangular disk body.

\* \* \* \* \*